US006772222B1

(12) United States Patent
Gallo et al.

(10) Patent No.: US 6,772,222 B1
(45) Date of Patent: Aug. 3, 2004

(54) MULTICAST FORWARDING TABLE PROCESSOR

(75) Inventors: Anthony Matteo Gallo, Apex, NC (US); Sonia Kiang Rovner, Chapel Hill, NC (US); Natarajan Vaidhyanathan, Durham, NC (US); Gail Irene Woodland, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/545,576

(22) Filed: Apr. 7, 2000

(51) Int. Cl.$^7$ ............... G06F 15/173; H04L 12/28
(52) U.S. Cl. ............. 709/238; 370/469; 370/395.5; 370/395.52; 713/163
(58) Field of Search ................ 709/236, 238, 709/245; 370/419, 427, 902, 903, 911, 469, 351, 352, 353, 354, 355, 356, 392, 395.31, 395.52; 713/163; 379/238

(56) References Cited

U.S. PATENT DOCUMENTS

| 5,909,686 A | * | 6/1999 | Muller et al. ........... 707/104 |
| 5,938,736 A | * | 8/1999 | Muller et al. ........... 709/243 |
| 6,356,951 B1 | * | 3/2002 | Gentry, Jr. ............. 709/250 |

OTHER PUBLICATIONS

Fast and scalable layer four switching, Srinivasan, V.; Varghese, G.; Suri, S.; Waldvogel, M., ACM SIGCOMM '98, ISSN: 0146–4833, pp. 191–202.*

Distributed core multicast (DCM): a multicast routing protocol for many groups with few receivers, Blazevi, L.; Le Boudec, J., ACM SIGCOMM, vol. 29, Oct. 1999, ISSN: 0146–4833, pp. 6–21.*

An architecture for wide–area multicast routing, Deering, et. al., Conference on Comm. architectures, protocols and application, London, 1994, ISBN: 0–89791–682–4, pp. 126–135.*

* cited by examiner

*Primary Examiner*—Jack B. Harvey
*Assistant Examiner*—Beatriz Prieto
(74) *Attorney, Agent, or Firm*—McGuirewoods LLP; J. Cockburn

(57) ABSTRACT

A multicast processor minimizes the software resource needed to process multicast protocol and broadcast protocol for bridges and routers in a network processor based environment. The multicast forwarding processor receives multicast and broadcast Layer 2/Layer 3/Layer 4 (L2/L3/L4) frames from a network processor. During reception, a frame layer flag, a unicast/multicast flag, and a frame position flag are set. A multitask forwarding table is accessed, and the frame, unicast/multicast, and frame position flags are stored and updated. The frame, unicast/multicast, and frame position flags are then sent to a frame forwarding processor. The L2/L3/L4 frames are routed to an L2 learning processor. The L2/L3/L4 frames are received from the frame forwarding processor, and the L2/L3/L4 frames are sent to an L3/L4 processor for frame header modification. The modified L2/L3/L4 frames are received from said L3/L4 processor, and the modified L2/L3/L4 frames are sent to an L2 filter processor.

11 Claims, 5 Drawing Sheets

MULTICAST FORWARDING TABLE PROCESSOR

BACKGROUND OF THE INVENTION

1. Field of the Invention

The present invention generally relates to a multicast forwarding processor and, more particularly, to a processor which minimizes the software resource needed to process multicast protocol and broadcast protocol for bridges and routers in a network processor based environment.

2. Background Description

The problem of the design of computer networks is partitioned into smaller subtasks, by dividing the problem into layers. The OSI (Open Systems Interconnection) reference model defines seven layers. This invention is primarily concerned with the protocols of Layer 2, the data link layer, Layer 3, the network layer, and Layer 4, the transport layer. Each layer communicates with its peer layer in another node in the network through the use of a protocol. A multicast address is intended to be destined to a group of nodes, as opposed to a unicast address which is destined for a single node in the network.

While the Multicast Identifier (MID) is a well-known field regarding multicast flows, the definition of this term and how is used still needs to be properly introduced. An MID is simply a number that can be used to identify a grouping of logical or physical ports, or nodes, that need to receive a frame. This typically is done using a port vector mask in many multi-layer switches but, due to the large number of ports supported by large systems, the use of a port vector mask is impractical. For example, in some system chassis over 200 ports can exist. This would require a vector greater than 200 bits to be sent along with each frame as it traversed the switch internally. Also, multicast flows are broken down into ingress and egress processing in a network processor. During the ingress processing, the Network Processor (NP) needs to know "what target blades or Network Processor do I need to send this frame to?" On the egress side processing, the NP needs to know "what target ports do I need to send this frame to and how should I modify it?" Because of this the concept, a globally defined Multicast Identifier (MID) was introduced. Each MID is associated with a structure within the system that identifies a collection of blades, ports, and other attributes that affect the frame's forwarding.

On the ingress NP, the MID identifies a list of target NPs needed by the ingress NP to identify which of the NPs should receive a copy of this frame. Some products use hardware that replicates the frame by sending it out multiple switching fabric interfaces. Other products make use of the switching fabric subsystem for frame replication to each of the NPs. In either case, the frame replication performed by the hardware is transparent to the ingress NP.

On the egress NP, the MID directly or indirectly identifies the list of target ports needed by the egress side to forward the frame. On each egress NP the multicast list is simply turned into a series of unicast enqueues or dispatches to each of the ports. While the multicast is turned into a series of unicast enqueues an additional parameter is passed during the enqueue to assist the hardware in knowing when to release the buffer used for storing the frame. The hardware keeps a count of each of the enqueues and releases the memory used to store the frame during processing once all of the target ports have finished transmitting the frame.

In a Layer 2/3 switch, when a multicast frame is received on a given port, it may need to be both routed and bridged by the switch. All other ports within the source port's Virtual Local Area Network (VLAN) will need to receive an identical copy of the frame. However, if the frame is IPv4 (Internet Protocol version 4) for example, and also routed to another VLAN, the frame must be modified. Therefore, each NP needs to know the original VLAN the frame was received on as well as the source NP so it can determine how to process the frame. The MID by itself does not contain enough information. For this reason frames that are both bridged and routed must be identified by a unique frame header (FH).

It is worth noting that frame modification for multicast flows should not be done on the ingress and then removed on egress. While the operations performed for a protocol like IP are trivial the encapsulation of the frame itself may need to change for each VLAN. This would complicate the egress processing significantly.

Examples of users of multicast services for a multi-layer switch include:

Layer 2 Bridging, multicast frames need to be forwarded to all ports in a VLAN. Unicast frames whose destination address (DA) has not been learned need to be forwarded to all ports in a VLAN.

VLANs may construct multicast trees for different protocol based VLANs.

Layer 3 IPv4 multicast routing can be used for IPv4 to route frames to multiple VLANs.

SUMMARY OF THE INVENTION

It is therefore an object of the present invention to provide a multicast processor which minimizes the software resource needed to process multicast protocol and broadcast protocol for bridges and routers in a network processor based environment.

According to the invention, there is provided a multicast forwarding processor which receives multicast and broadcast Layer 2/Layer 3/Layer 4 (L2/L3/L4) frames from a network processor. During reception, a frame layer flag, a unicast/multicast flag, and a frame position flag are set. A multitask forwarding table is accessed, and the frame, unicast/multicast, and frame position flags are stored and updated. The frame, unicast/multicast, and frame position flags are then sent to a frame forwarding processor. The L2/L3/L4 frames are routed to an L2 learning processor. The L2/L3/L4 frames are received from the frame forwarding processor, and the L2/L3/L4 frames are sent to an L3/L4 processor for frame header modification. The modified L2/L3/L4 frames are received from said L3/L4 processor, and the modified L2/L3/L4 frames are sent to an L2 filter processor.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
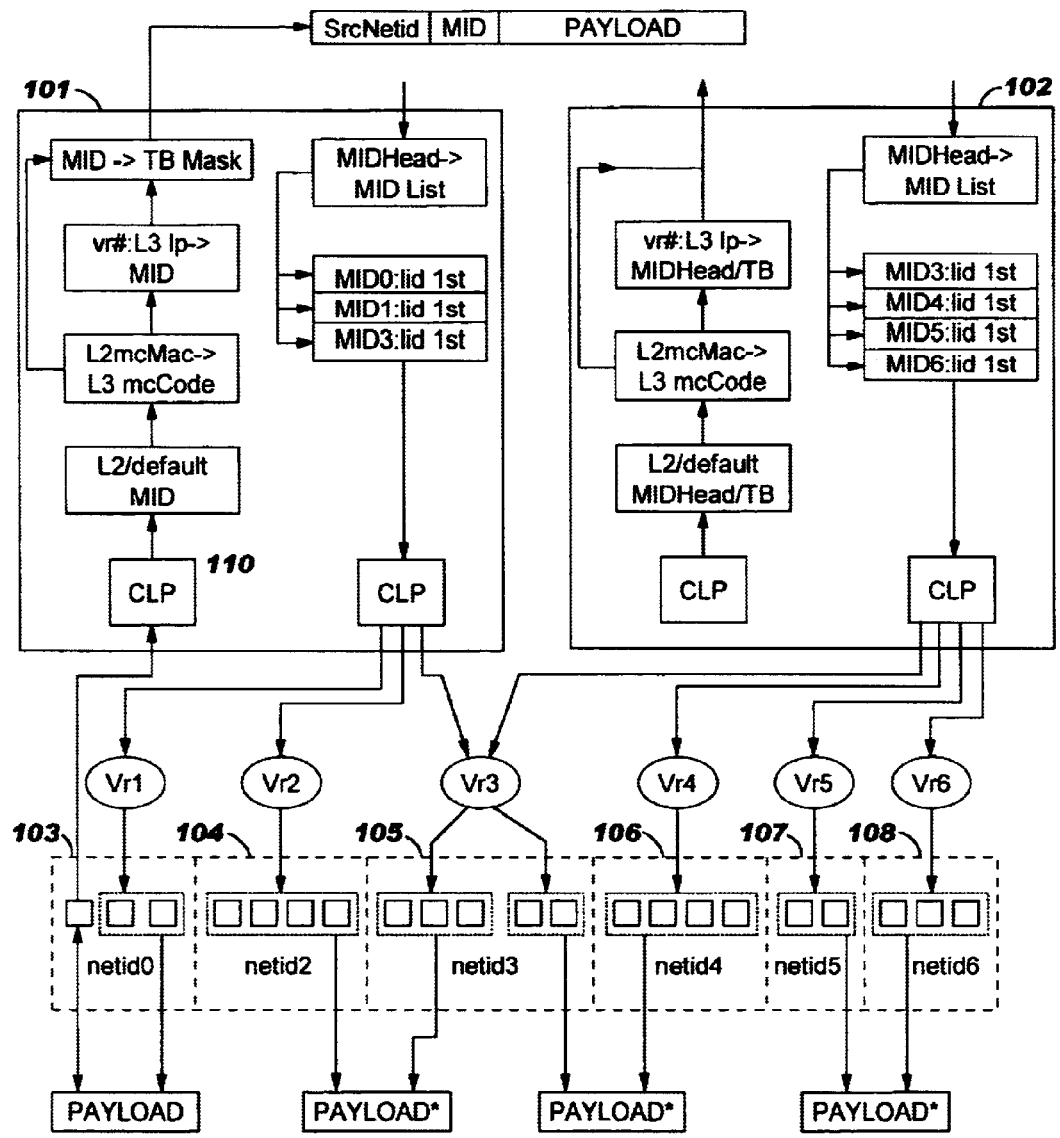
FIG. 1 is a block diagram showing how Multicast Identifiers (MIDs) are related for two Network Processors (NPs) managing six different port based Virtual Local Area Networks (VLANs)

Referring now to the drawings, and more particularly to FIG. 1, there is shown an example of how MIDs are related for two NPs 101 and 102 managing six different port based VLANs 103 to 108. The "dashed" boxes are used to identify the logical grouping of port based VLANs. In FIG. 1, a frame or "PAYLOAD" is received in the first port labeled "netid0" of VLAN 103. Because there are multiple ports in this VLAN, the frame must also be bridged out the other ports in the VLAN labeled netid0. The other port based VLANs 104 to 108, labeled netid2, netid3, netid4, netid5, and, netid6, are assumed to be routed IPv4 multicast networks, and a modified version of the frame is sent on each. The actual modifications made to the outbound frame are irrelevant for this example. In this example it will be assumed that the MID values already exist and contain the appropriate information for forwarding the multicast flows. Once the forwarding usage of MIDs has been described, "how" these values are created and/or allocated will be addressed.

When an Ethernet multicast addressed frame is received by the ingress NP, it will need to see if any higher layer protocols have registered to receive this address. If not, the NP will forward the frame to its default MID for the VLAN. However, if a higher layer protocol has registered for the address, the frame is passed to that protocol for forwarding. In this example that would be the Layer 3 IP multicast forwarding code. The higher layer protocols must always forward the frame out the other ports residing in the VLAN at a minimum. This can be easily done using the default MID already found by the previous layer. It may also want to forward the frame out other VLANs. To do this, it would need another MID that contained the default MID's attributes as well as the attributes of the additional VLANs the frame should be forwarded to. For the ingress processing, the main attribute needed from this MID, would be "what target NPs should receive this frame." When the frame is received on each of the target blades, the MID attributes would need to specify "what target ports and frame modification to perform for this frame."

While the MID is a global identifier it should be clear that the attributes needed between the ingress and egress NPs have little in common except for the MID value itself. Because of this, the MID can be thought of as a key into two different tables depending on ingress or egress processing state of the frame. The actual value of a MID is assigned by the Multicast Resource Manager from a free list of unused MIDs in a round-robin fashion. MID values should be treated as arbitrary by all the code that uses them and purged when the switch is re-booted. The Multicast Resource Manager manages all MIDs based on API (Application Program Interface) function calls that any registered user in the system can use to create, modify, delete, or query for multicast information. The MIDs used to manage multicast traffic by the switch is a distributed database.

The Multicast Resource Manager maintains a global copy of all MIDs in use and specific information based on the MID type. There are two types of MIDs that can be allocated in the system. Simple MIDs (SMID) are a collection of ports residing on one or more NPs sharing similar properties. Compound MIDs (CMID) are a collection of multiple MIDs derived from Simple MIDs or other Compound MIDs. Compound MIDs also allow the ability to override the properties of each MID in the collective. The limit of nesting MIDs is three levels where one Compound MID can reference another Compound MID which must reference a Simple MID. The Switch DD maintains a global copy of all information associated with Simple MIDs. For Compound MIDs, the Multicast Resource Manager only maintains the list of MIDs that make up the Compound MID and any overriding properties associated with it. The Multicast Resource Manager does not maintain a master table of "all" MID information contained at each NP, but it does have access to it (e.g., does not keep compound blade contents).

Each NP maintains the MIDs specific for that blade along with NP/port information specific to the MID. However, the information resides in two different tables. The information created for a Simple MID is as follows:

When a SMID type is requested using Multicast Resource Manager API, the target NPs, ports, VLAN ID, handle, and properties of the group are specified. The Multicast Resource Manager returns the MID value in the handle and sends a multicast message to each NP based on the API parameters.

Each NP will build two table entries based off the received multicast message. The first entry is used by the ingress NP processing and will specify all NPs that should receive frames that match this MID. The second entry is used by the egress processing and will specify all target ports and any forwarding properties that should be applied for this MID.

When a Compound MID is requested, the information still resides in two different tables on the target NPs but, is built based on the existing MID table entries on each NP as follows:

When a Compound MID type is requested using the Multicast Resource Manager API (Application Program Interface) the Source VLAN, target VLANs, handle, and properties of the group or individual VLANs are specified. The Multicast Resource Manager returns the MID value in the handle and sends a multicast control message to each target NP based on the Multicast Resource Manager's global MID table values for regular MIDs used to create VLANs (e.g., sends only to the NP that have regular MIDs contained in the compound MID).

The control message sent to each of the target NPs contains the new Compound MID value returned to the user, the target blade vector used on the ingress, and for the egress processing the list of regular MID values that make up this new MID along with any override properties for the collective.

Each NP processes the request and creates two table entries. The first entry on the ingress side will specify all target NPs that should receive frames that match this MID. The second entry for egress processing will specify all the target MIDs and any forwarding properties that should be applied for this Compound MID or each of the target MIDs.

By using Compound MIDs, the existence of physical ports or groupings of physical ports is not tied directly to every MID. The benefit of this approach is significant for maintaining Layer 3 IP Multicast tables. Consider a router interface attached to a port based VLAN. If the router has 3000 Compound MIDs representing IP Multicast addresses associated with this VLAN and one of the ports goes away that has nothing to do with this traffic, none of these compound MIDs needs to be updated. If a port does go away that represents some or all of this IP Multicast traffic, then the multicast routing software would simply age out these entries when needed. The effect would be minimal to the system because aging is done in a controlled manner. However, if each MID listed every port in the system, the table overhead would be significant. When a port went down in the system the Multicast Resource Manager would have to notify every NP having an MID associated with that port. By using this table management scheme for multicast flows, changes to ports are limited in scope to only the target NP where the port resides and the global MID table in the Multicast Resource Manager.

Figure 2:
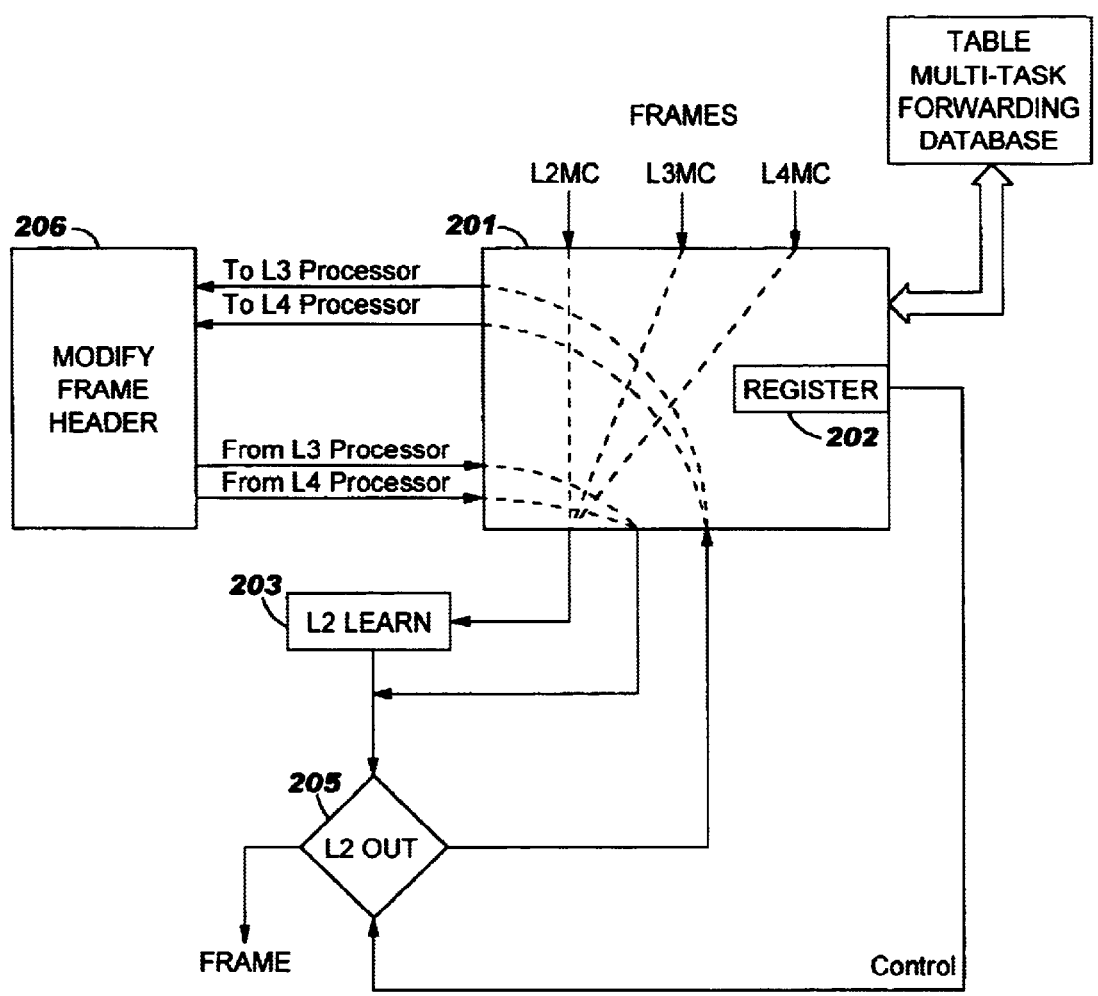
FIG. 2 is a block and logic diagram showing the main structural features of the invention.

The present invention solves the problem mentioned above by use of a special MID forward processor. This processor is used to 1) process MID tables, 2) provide an interface for protocols to access the NP tables, and 3) handle L3/L4 flow interaction. The invention is illustrated in FIG. 2 and described below. The main box 201 controls the frame direction sets the flag that indicates if the frame is L2, L3 or L4, and whether unicast (UC) or multicast (MC), and the first, middle, or last frame in the series. The register 202 keeps track of the frames position in the forwarding list. If it is an L2 frame, it is passed to the L2 learning function 203, the output of which is passed to decision function 205 which, under the control of register 202, either transmits the frame or returns it to box 201. If the latter, it is passed to the L3/L4 processors where the frame header is modified in box 206 and returned to decision function 205 via box 201.

Figure 3:
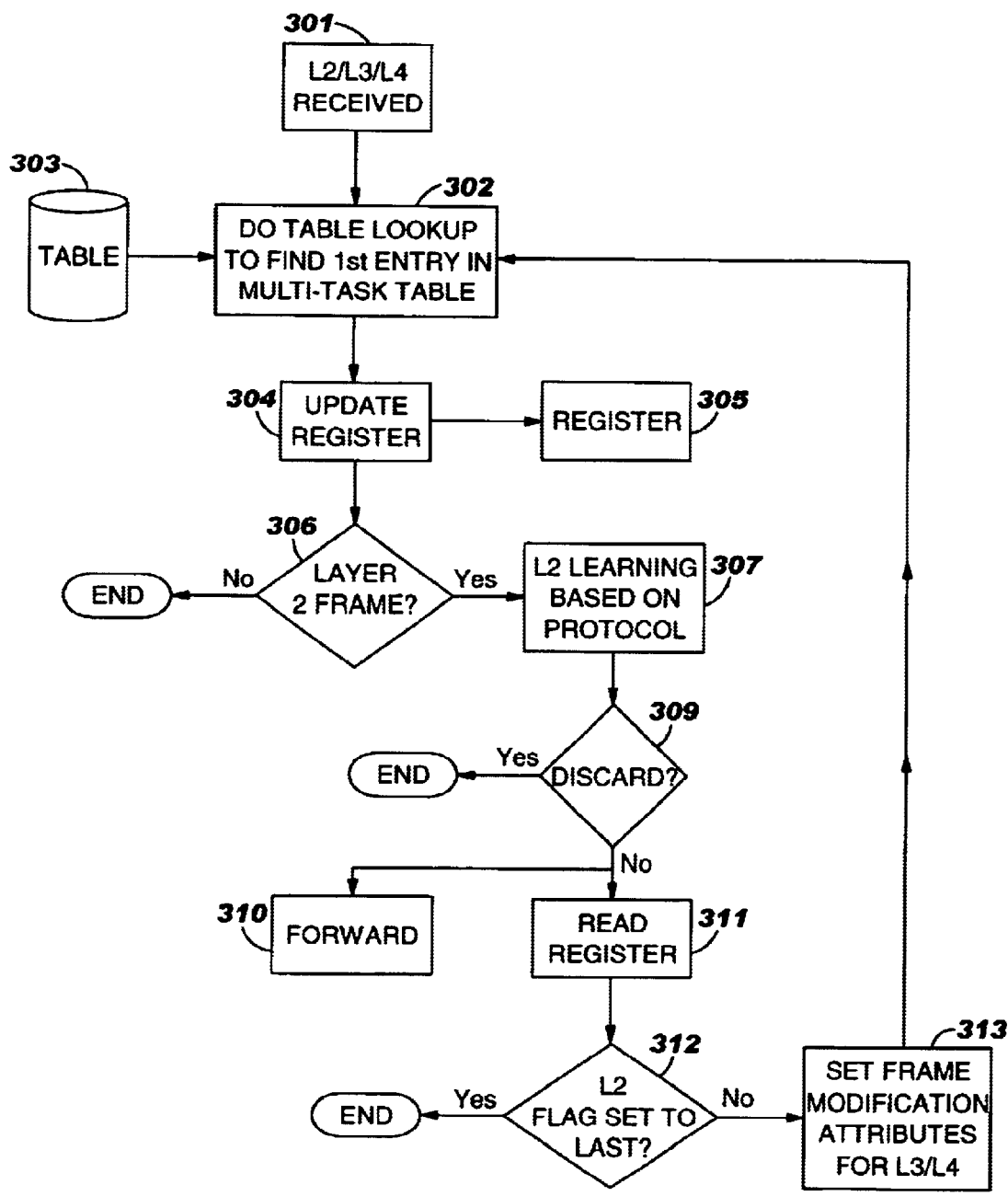
FIG. 3 is a flow diagram showing the logic of the process of the first embodiment of the invention.
Figure 4:
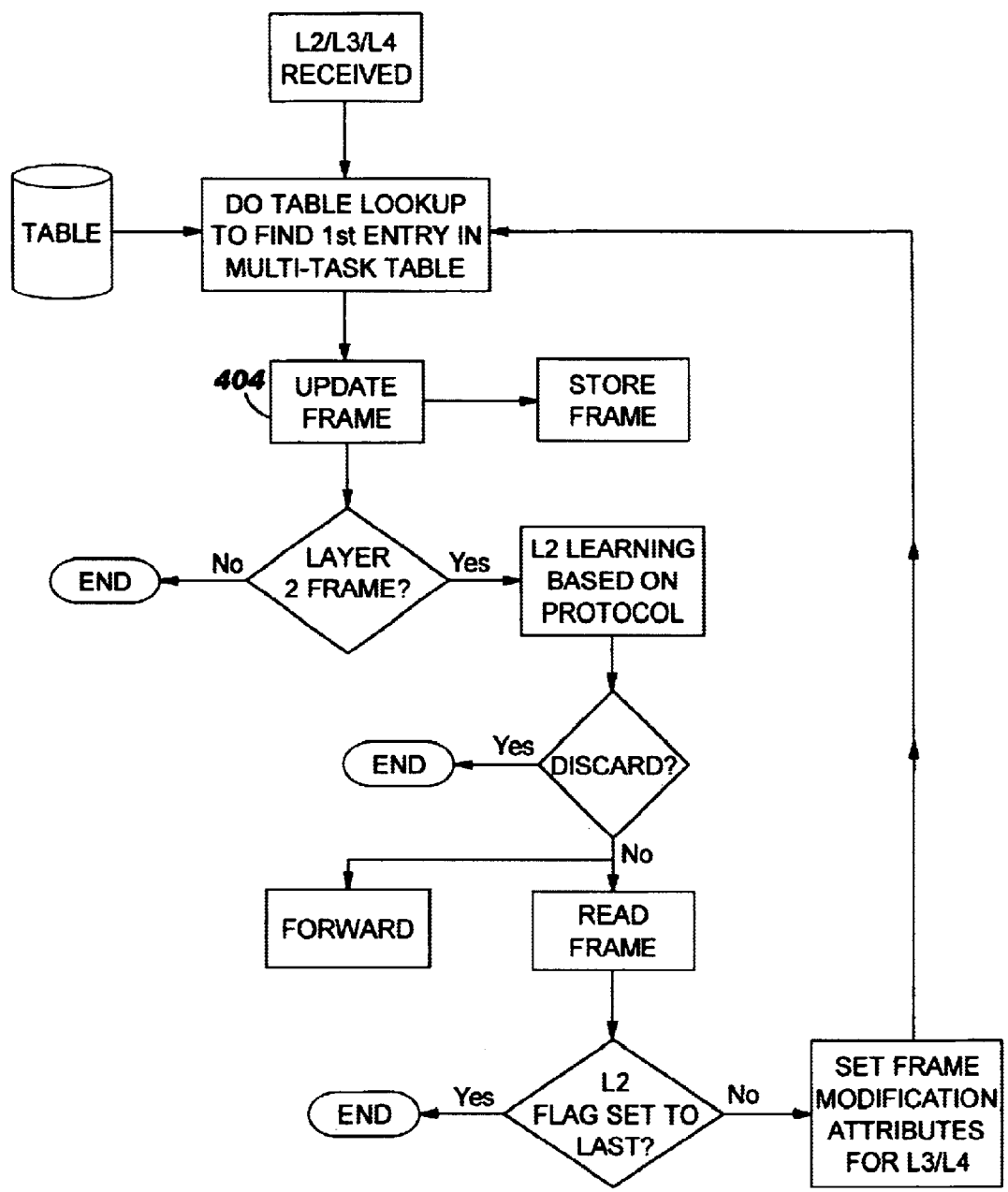
FIG. 4 is a flow diagram showing the logic of the process of the second embodiment of the invention.
Figure 5:
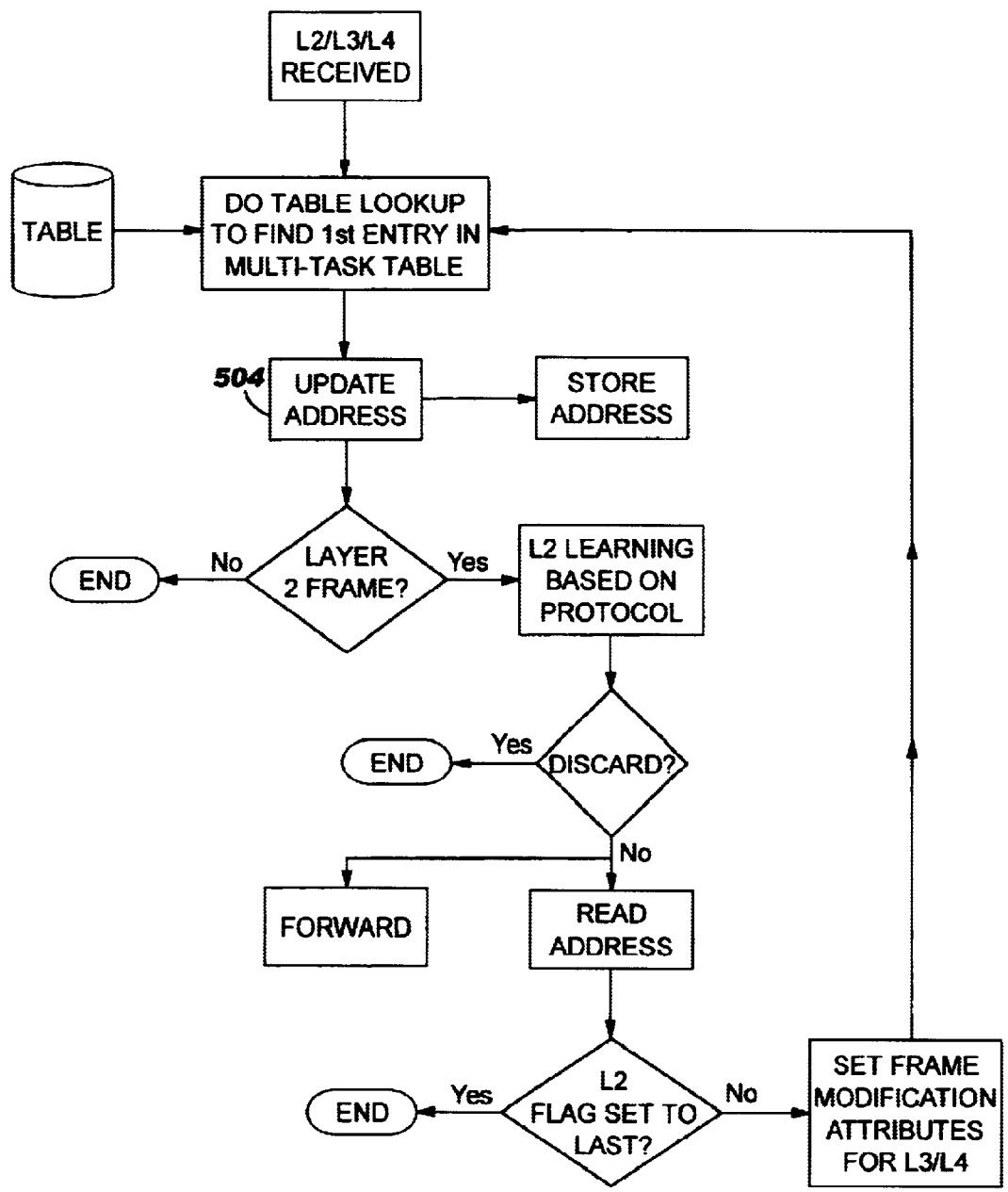
FIG. 5 is a flow diagram showing the logic of the process of the third embodiment of the invention.

FIGS. 3, 4, and 5 are flowcharts illustrating three embodiments of the present invention as shown more structurally in FIG. 2. The three embodiments differ only in that the first uses a register for the frames position in the forwarding list, the second stores the information in the frame, and the third stores the information in memory. The position-in the forwarding list is the flag described above. FIG. 3 will be explained in detail, and the modifications made by the embodiments of FIGS. 4 and 5 will then be explained.

In FIG. 3 a L2/L3/L4 MAC (Media Access Control) frame is received at input block 301. During this reception, the flag is set that tells if the frame is L2, L3, or L4, and unicast (UC) or multicast (MC), and the first, middle, or last frame in the series. Then, in function block 302, a lookup from the Mulitask Forwarding Data Base Table 303 is performed and the register 305 (see 202 in FIG. 2) updated in function block 304. The register tracks the frames position in the forwarding list. A test is made in decision block 306 to determine if the frame is an L2 frame. If the frame is not an L2 frame, processing terminates. If the frame is an L2 frame, L2 learning occurs based on protocol in function block 307, and a decision to discard or to forward the frame is made in decision block 309. If the frame is forwarded at function block 310, then the register is read in function block 311 and a determination made in decision block 312 as to the flag setting. If the flag is set to last, the process ends. If the flag is not set to last, the frame modification attributes are set in function block 313, and the process returns to function block 302 to perform another table lookup.

As mentioned, the FIG. 4 and FIG. 5 embodiments differ only slightly from the FIG. 3 embodiment. Whereas the FIG. 3 embodiment uses a register for the frames position in the forwarding list in function block 304, the FIG. 4 embodiment stores the information in the frame in function block 404, and the FIG. 5 embodiment stores the information in memory in function block 504.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A multicast forwarding processor comprising:
    means for receiving multicast and broadcast Layer 2/Layer 3/Layer 4 (L2/L3/L4) frames from a network processor;
    means for setting a frame layer flag;
    means for setting a unicast/multicast flag;
    means for setting a frame position flag;
    means for accessing a multitask forwarding table;
    means for storing and updating said frame layer, unicast/multicast, and frame position flags and sending said frame layer, unicast/multicast, and frame position flags to a frame forwarding processor;
    means for routing said L2/L3/L4 frames to an L2 learning processor;
    means for receiving said L2/L3/L4 frames from said frame forwarding processor and for sending said L2/L3/L4 frames to an L3/L4 processor for frame header modification;
    means for receiving modified L2/L3/L4 frames from said L3/L4 processor and transmitting the frame; and
    a multicast identifier (MID) structure indexed by a MID that provides routing information for routing incoming said L2/L3/L4 frames to outgoing destinations, wherein the MID structure comprises a receive MID structure and a transmit MID structure and the MID identifies one or more other MIDs, wherein each MID is one of a simple MID (SMID) and a compound MID (CMID).

2. The multicast forwarding processor of claim 1, wherein the means for setting a frame position flag includes setting a frame position flag in one of a register, a frame, and an address.

3. The multicast forwarding processor of claim 1, wherein, the receive MID structure contains entries defining one or more destination blades and indexable by the MID, the transmit MID structure contains entries identifying at least one of one or more ports and one or more blades, the transmit structure indexable by the MID.

4. The multicast forwarding processor of claim 1, wherein, the CMID is capable of overriding SMID properties.

5. The multicast processor of claim 1, wherein the MID is a global index maintained by a network processor so that the global index is used to index both the receive MID structure and the transmit MID structure.

6. The multicast process of claim 5, wherein the receive MID structure and the transmit MID structure are associated with different blades.

7. A method performed by a multicast forwarding processor comprising the steps of:
    receiving multicast and broadcast Layer 2/Layer 3/Layer 4 (L2/L3/L4) frames from a network processor;
    setting a frame layer flag;
    setting a unicast/multicast flag;
    setting a frame position flag;
    accessing a multitask forwarding table;
    storing and updating said frame, unicast/multicast, and frame position flags and sending said frame, unicast/multicast, and frame position flags to a frame forwarding processor;
    routing said L2/L3/L4 frames to an L2 learning processor;
    receiving said L2/L3/L4 frames from said frame forwarding processor and sending said L2/L3/L4 frames to an L3/L4 processor for frame header modification;

receiving modified L2/L3/L4 frames from said L3/L4 processor and transmitting the frame;

accessing a multicast identifier (MID) structure indexed by a MID to identify a routing destination for routing said L2/L3/L4 frames including indexing a receive multicast identifier (MID) structure having entries indexable by the MID, wherein the indexing includes associating one or more MIDS with one or more other MIDs, the one or more other MIDs being one of a simple MID (SMID) and a compound MID (CMID).

8. The method of claim 7, including the receive MID structure entries identifying at least one destination blade, and indexing a transmit MID structure having entries indexable by the MID, the transmit structure entries identifying at least one of a blade and one or more ports.

9. The method of claim 8, wherein the indexing a transmit MID step accesses the transmit MID structure entries that include format information for formatting frames for transmission.

10. The method of claim 7, wherein in the associating step the CMID has properties that override SMID properties.

11. The method of claim 7, wherein the setting a frame position flag includes setting the frame position flag in one of a register, a frame, and an address.

* * * * *